US005410793A

United States Patent [19]

VanBibber

[11] Patent Number: 5,410,793

[45] Date of Patent: May 2, 1995

[54] TOOL USED FOR REMOVING SPINDLE BEARINGS

[76] Inventor: Charles E. VanBibber, 8308 Balmoral Dr., Tallahassee, Fla. 32311

[21] Appl. No.: 143,628

[22] Filed: Nov. 1, 1993

[51] Int. Cl.[6] .................... B23P 19/04

[52] U.S. Cl. .................... 29/263

[58] Field of Search .................... 29/256, 258-266

[56] References Cited

U.S. PATENT DOCUMENTS

| | | | |
|---|---|---|---|
| 1,465,124 | 8/1923 | Gardner | 29/263 |
| 1,478,064 | 12/1923 | Klay . | |
| 1,625,344 | 4/1927 | Vingheroets | 29/263 |
| 2,424,681 | 7/1947 | Eberhart | 29/263 |
| 3,089,229 | 5/1963 | Brodie . | |
| 4,173,813 | 11/1979 | Stockinger . | |
| 4,507,838 | 4/1985 | Hacher . | |
| 4,724,608 | 2/1988 | Parrett . | |
| 4,852,235 | 8/1989 | Trease et al. . | |
| 5,177,853 | 1/1993 | Herook | 29/266 |

*Primary Examiner*—Robert C. Watson

*Attorney, Agent, or Firm*—Carnes, Cona, Dixon

[57] ABSTRACT

This invention provides for a tool to remove spindle, wheel, or other type bearings located in conventional spindles for various four wheel drive vehicles. The tool consists of an elongated threaded rod, washers, a body member, nuts, and an extractor having a unique configuration.

The tool is inserted into the bore of the spindle at an angle to allow for the extractor to pass through the bearing and be located under the bearing. A conventional hand ratchet, air ratchet, or hand wrench is then used to rotate the nut clockwise in order to remove the bearing from the spindle.

19 Claims, 5 Drawing Sheets

TOOL USED FOR REMOVING SPINDLE BEARINGS

BACKGROUND OF THE INVENTION

Working on cars, trucks, and the like requires the use of a multitude of specialized tools. Each separate component of the vehicle will have its own unique set of tools and devices to work on that particular component. Each such unique tool will not only be expensive to purchase but will typically perform just one specialized function. Therefore, mechanics will zealously guard and protect these tools.

Working on spindle bearings for four wheel drives is no exception to the above tool requirement. Removing a spindle from a wheel bearing requires the use of just such a specialized tool. Typically, such a spindle remover requires the use of a specialized puller. Examples of such tools are found in patents U.S. Pat. Nos. 4,852,235, 4,724,608, 4,507,838, 4,173,813, 3,089,229, and 1,478,964.

As seen by these patents, this type of tool is constructed of many parts. Being complex, these tools are expensive to manufacture. Furthermore, should the tool break, it will not only be expensive to repair, the mechanic will be without the use of the spindle puller for several days awaiting the replacement part to arrive.

What is needed is a spindle bearing puller that is easy to manufacture, and is made from only readily available components, and is easy to use. The present invention provides just such a tool.

The spindle bearing puller of the present invention is made from only readily available parts. Construction of the invention is inexpensive and straight forward. The spindle puller is relatively easy to operate and use. The part of the invention that is in direct contact with the bearing, that part which is most likely to fail, is one piece and is very inexpensive to produce. Therefore, a mechanic can have several in stock, thereby relieving any problems of associated with tool failure.

The tool of the present invention will provide a mechanic with a spindle bearing puller that is sturdy in construction, is inexpensive to purchase and repair, and is very simple to use.

SUMMARY OF THE INVENTION

This invention provides for a tool to remove bearings located in conventional spindles for various four wheel drive vehicles. The tool consists of an elongated threaded rod, washers, a body member, nuts, and an extractor having a unique configuration.

The tool is inserted into the bore of the spindle at an angle to allow for the extractor to pass through the bearing and be located under the bearing. Once the extractor has passed the bearing in the spindle, the bearing puller is rotated to a straight vertical position. The body member, a washer and a nut, are moved to meet the spindle. This nut is rotated clockwise with a hand or conventional air powered ratchet or hand wrench in order to remove the bearing from the spindle.

The tool is provided with an anti-rust finish.

A specialized bearing installer tool is used to replace a bearing into the spindle. Due to the unique design of the installer tool, replacing the bearing in the spindle is done quite easily and quickly.

Thus it is the object of the present invention to provide a tool for removing bearings from a four wheel drive spindle.

It is another object of the present invention to provide for a tool that is easy to use and manufacture.

It is another object of the present invention to provide for a tool that is durable.

It is another object of the present invention to provide for a tool that is inexpensive to fabricate.

It is another object of the present invention to provide a tool to simplify the replacement of the bearing in a spindle.

BRIEF DESCRIPTION OF THE DRAWINGS

FIG. 4*b* is a cross sectional view of the body member of the present invention taken along lines 4*b*—4*b* of FIG. 4a.

DETAILED DESCRIPTION OF THE PREFERRED EMBODIMENT

Figure 1:
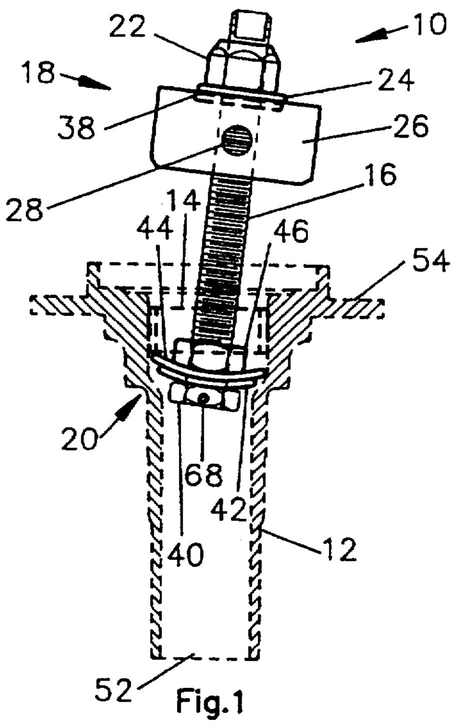
FIG. 1 is a side view of the bearing puller being inserted into a spindle.
Figure 2:
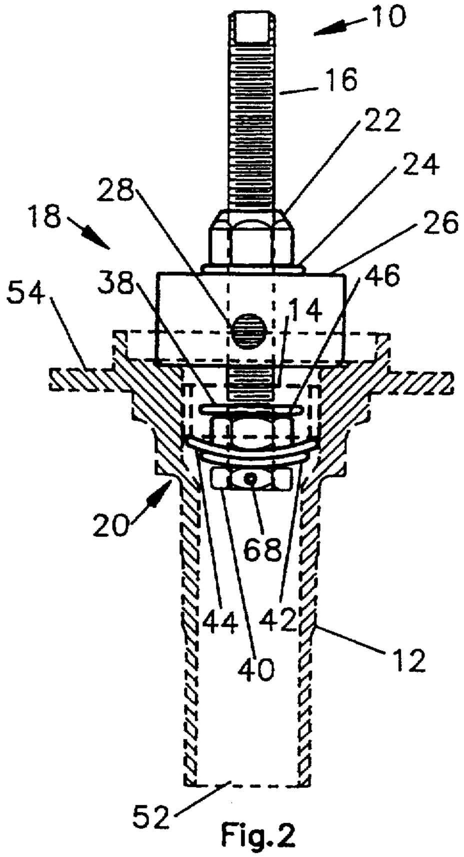
FIG. 2 is a side view of the bearing puller of the present invention being inserted under the bearing located in the spindle.
Figure 3:
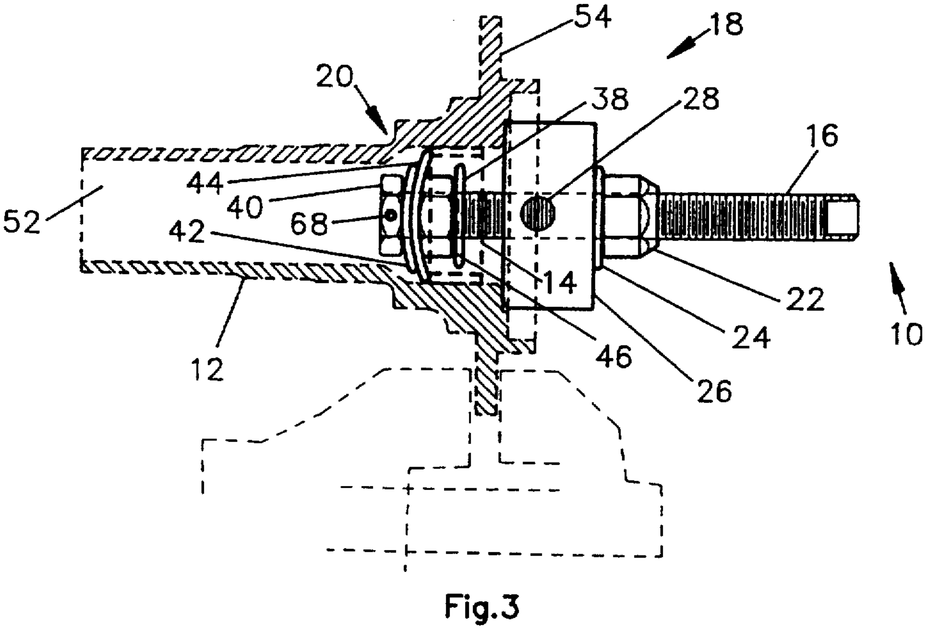
FIG. 3 is a side view of the bearing puller, of the present invention, after having removed a bearing from a spindle.

FIGS. 1, 2 and 3 illustrate the side view of the bearing puller 10 being inserted into a conventional spindle 12, found on various four wheel drive vehicles, in order to remove a bearing 14. This spindle consists of a bore 52 containing the bearing 14. The spindle 12 also includes a flange 54.

The bearing puller 10 consists of an elongated threaded rod 16 having a top end portion 18 and a bottom end portion 20 and having several threads. The bottom end portion 20 is inserted into the spindle 12 to remove the bearing 14.

Located at the top end portion 18 of the threaded rod 16 is a first nut 22. This first nut 22 is longer than the other nuts and washers of the bearing puller 10 to allow more teeth of the threaded rod 16 to support the load and provide a better means of stress distribution. Below the first nut 22 is a washer 24. Underneath the washer 24 is a puller body member 26, having a viewing window 28. The washer 24 reduces the stress concentration on the housing by increasing the bearing or load's surface area.

Figure 4A:
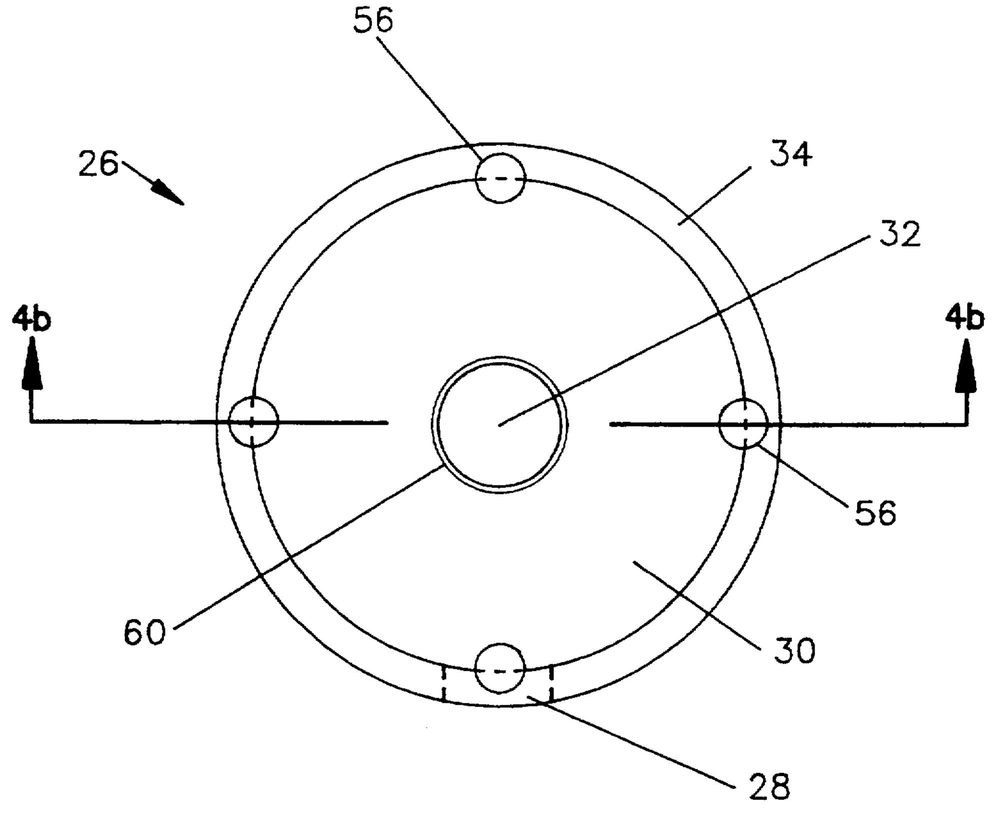
FIG. 4*a* is a bottom planar view of the body member of the present invention.
Figure 4B:
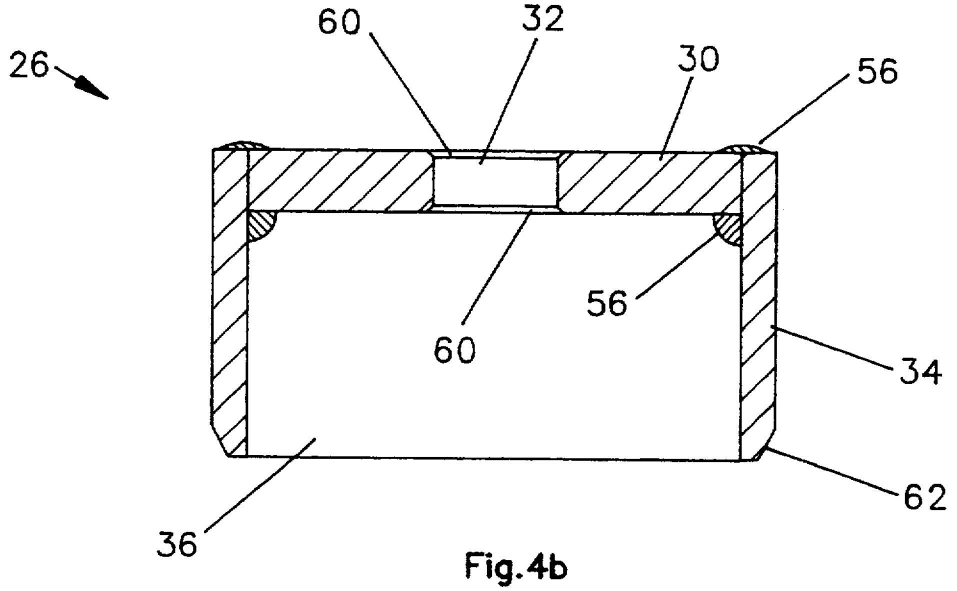

The puller body member 26, as illustrated in FIGS. 4*a* and 4*b*, has a circular top wall 30, an aperture 32 located on the top wall 30 for receiving the threaded rod 16, an encompassing cylindrical side wall 34, and an open bottom 36. The aperture 32 has a diameter slightly larger that the diameter of the threaded rod 16. Located on the encompassing cylindrical side wall 34 is the viewing window 28. This viewing window 28 is used to see the bearing as it is pulled from the spindle. Tapering 60 occurs at the top and bottom area of the aperture 32. This tapering 60 creates a ridge which enables the puller body member 26 to catch the threads of the threaded rod 16 and inhibit translational motion between the threaded rod 16 and the puller body member 26. Additionally, the puller body member 26 can be constructed of any durable and sturdy material such as steel, Kevlar, PVC, plastic or any grade A material. To reduce the cost of the bearing puller 10, the encompassing cylindrical side wall 34 of the puller body member 26 can be manufactured out of a standard, nominally sized pipe and the circular top wall can be spot welded 56 to the circular top wall 30.

If the encompassing cylindrical side wall 34, of the puller body member 26 is fabricated out of a standard, nominally sized pipe, then the bottom area must be beveled 62 at approximately 45 degrees. This bevel 62 of the encompassing cylindrical side wall 34 is done to provide for the puller body member 26 to fit into the recess of the spindle.

A second washer 38, as illustrated in FIGS. 1, 2 and 3 is situated under the puller body member 26. This second washer 38 assists in aligning the threaded rod 16 in the spindle's bearing during extraction.

Affixed to the bottom end portion 20 of the threaded rod 16 is a second nut 40. The nut is permanently attached to the threaded rod 16 by any conventional attachment means, such as welding or the insertion of a roll pin.

A brace washer 42 is situated on the second nut 40. The brace washer 42 supports an extractor 44 having an unique configuration. Constraining the extractor 44 and brace washer 42 to a fixed position is a third nut 46. The extractor 44 is used to interface between the bearing 14 and the puller body member 26.

Figure 5A:
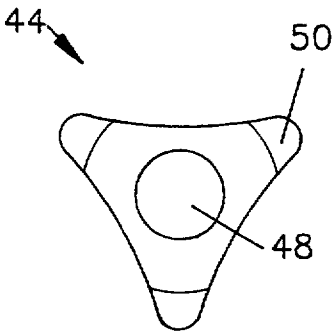
FIGS. 5*a–c* are the planar views of the various shapes for the extractor used in the bearing puller of the present invention.
Figure 5B:
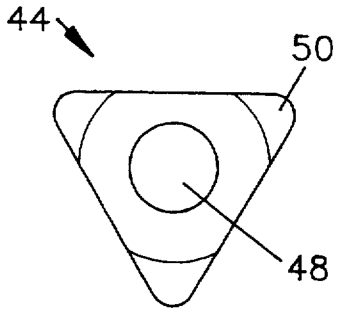
Figure 5C:
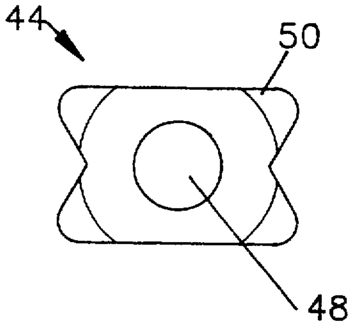

The extractor 44 can be constructed into numerous shapes as illustrated in FIGS. 5*a*–5*c*. In these figures, the extractors 44 have holes 48 for receiving the threaded rod or bolt 16. Each extractor 44 has extended flanges 50 which provide an easy and quick means for inserting the bottom end portion 20 of the bearing puller 10 into the spindle 12 and removing the bearing 14. These extractors have a thickness of about ⅛ of an inch.

Figure 7:
FIG. 7 is a side view of the extractor used in the bearing puller of the present invention.
Figure 6:
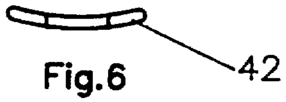
FIG. 6 is a side view of the brace washer used in the bearing puller tool of the present invention.

As illustrated in FIGS. 6 and 7, the brace washer 42 and the extractor 44, respectively, are both concaved to form a bevel. This bevel provides for the brace washer 42 and the extractor, 44 to fit snugly under the bearing 14 for simple removal.

The bearing 14 can easily be removed from the spindle 12 by the bearing puller 10. To do so, the spindle 12 must first be placed on a flat solid surface, with the flange 54 of the spindle facing upward. Situating the first nut 22, washer 24, puller body member 26, and second washer 38, at the top end portion of the threaded rod 16, insert the bearing puller into the bore 52 of the spindle at an angle so that the extractor passes the bearing 14 (illustrated in FIG. 1).

Once the extractor 44 has passed the bearing 14 in the spindle 12, the bearing puller 10 is rotated to a straight vertical position, at an inclination normal to the face of the flange. The second washer 38 is inserted into the bore 52 of the spindle. The puller body member 26 is then moved to meet with the spindle 12. The washer 24 is moved to meet the puller body member, and the first nut 22 is screwed to meet the puller body. Clockwise rotation of the first nut 22 is continued in order to alleviate free play between the puller body member 26 and bottom of the bearing (illustrated in FIG. 2).

To limit the movement of spindle 12 with the bearing puller 10, the device is placed in a vise. With a air powered ratchet, hand ratchet or hand wrench, the first nut 22 is turned clockwise to remove the bearing. During this process the viewing window 28 in the puller body member 26 is used to see the bearing as it is pulled from the spindle. Thus the bearing is removed from the spindle (illustrated in FIG. 3).

Figure 8A:
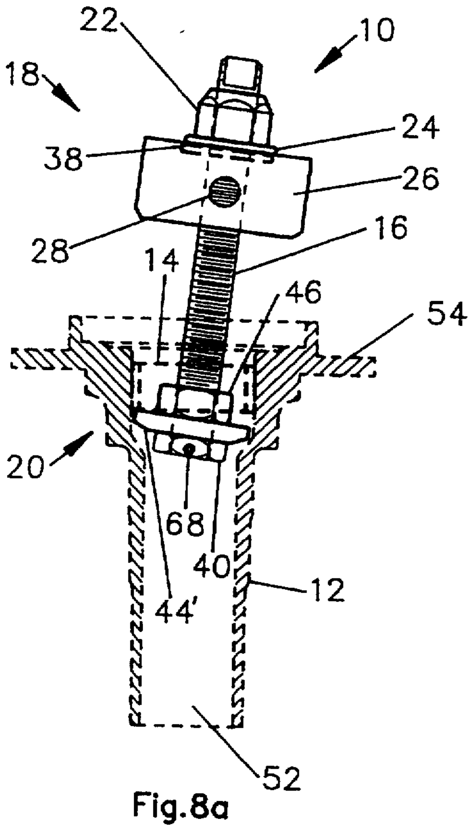
FIG. 8*a* is a side view of the bearing puller, in an alternative embodiment of the present invention, being inserted into a spindle.

An alternative embodiment of the present invention is illustrated in FIG. 8*a*. In this figure, the bearing puller 10 consist of an elongated threaded rod 16 having a top end portion 18 and a bottom end portion 20. The design and configuration of the top end portion 18, as seen in FIG. 8*a*, is the same as the top end portion illustrated in FIGS. 1, 2 or 3.

Located at the top end portion 18 of the threaded rod 16, shown in FIG. 8*a* is a first nut 22. Below the first nut 22 is a washer 24, a puller body member 26 and a second washer 38.

The puller body member 26 is illustrated in detail in FIGS. 4*a* and 4*b*. In these figures the puller body member has a circular top wall 30, an aperture 32 located on the top wall 30 for receiving the threaded rod 16, an encompassing cylindrical side wall 34 and an open bottom 36. A viewing window 28 is located on the encompassing cylindrical side wall 34 in order to see the bearing being extracted from the spindle. Countersinking 60, occurs at the top and bottom area of the aperture 32. This countersinking creates a ridge which enables the puller body member 26 to catch the threads of the threaded rod 16 and inhibit translational motion between the threaded rod 16 and the puller body member 26. Additionally this puller body member 26 can be made of any durable or study material, such as steel, Kevlar, PVC, plastic or any grade A material.

The second washer 38 that is located beneath the puller body member is used to assist in aligning the threaded rod 16 in the spindle during extraction.

Affixed to the bottom end portion 22 of the threaded rod 16 is a second nut 40. This nut is permanently attached by a roll pin 68. Located above the second nut 40 is an extractor 44'. This extractor 44', must be at least twice the thickness of the extractor illustrated in FIGS. 1–3. Additionally the bottom area of the extractor 44' is tapered to form a bevel. Further, the extractor 44' can have the same shapes as the extractors 44, illustrated in FIGS. 5*a*–5*c*. Located on top of the extractor 44' is a third nut 46.

Figure 8C:
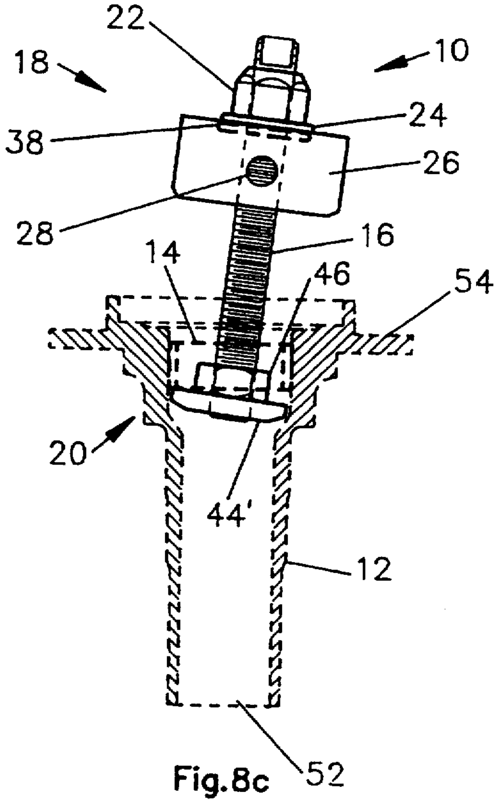
FIG. 8*c* is a side view of the bearing puller, in yet another alternative embodiment of the present invention, being inserted into a spindle.
Figure 8B:
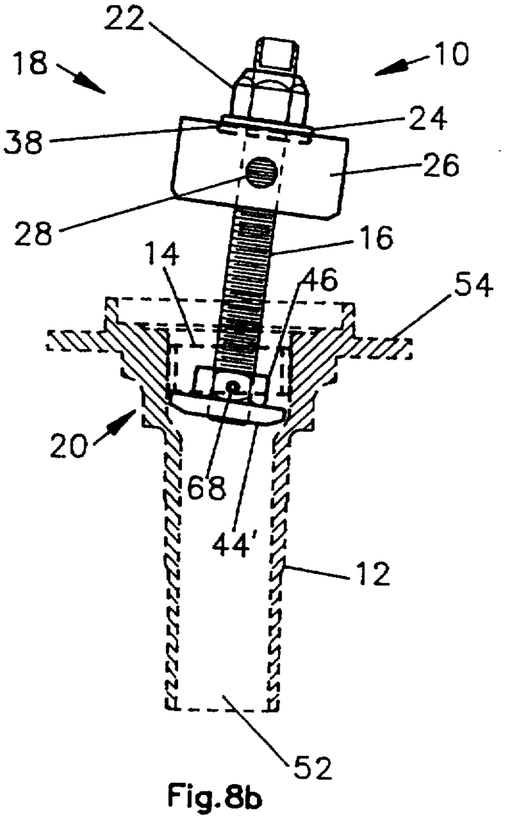
FIG. 8*b* is a side view of the bearing puller, in yet another alternative embodiment of the present invention, being inserted into a spindle.
Figure 8D:
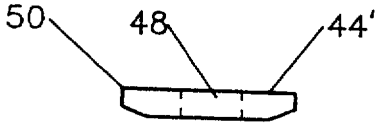
FIG. 8*d* is a side view of the extractor used in the bearing puller illustrated in FIG. 8*a*.

As illustrated in FIG. 8*d*, the extractor 44' is not threaded. Since the extractor 44' is not threaded, it is constrained by the second and third nut.

Another alternative embodiment for the bearing puller 10 is illustrated in FIG. 8*b*. In this figure, the top end portion 18 is the same as the top end portion illustrated in FIGS. 1–3 and 8*a* but the bottom end portion 20 is altered. In this embodiment the bottom end portion consists of a thick extractor 44'. This extractor is at least twice the thickness of the extractors illustrated in FIGS. 1–3 and 8*a*. Further, the bottom area of the extractor 44' is tapered to form a bevel. Additionally, the extractor 44' can have the same shapes as the extractor 44, illustrated in FIGS. 5*a*–5*c*. Permanently affixed atop the extractor 44' is another nut 46. This nut is affixed to the threaded rod 16 by a roll pin 68.

Figure 8E:
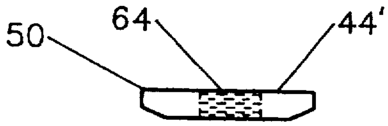
FIG. 8*e* is a side view of the extractor used in the bearing puller illustrated in FIG. 8*c*.
Figure 8F:
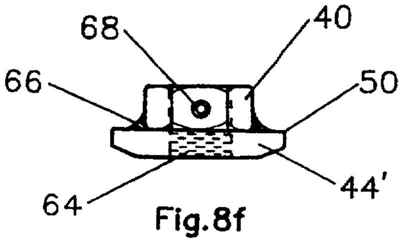
FIG. 8*f* is a side view of the extractor used in the bearing puller illustrated in FIG. 8*b*.

This bottom end portion 20 is illustrated in further detail in FIG. 8*f*. In this figure the extractor 44' is not threaded. Since it is not threaded the extractor 44' is permanently attached to a nut 46, by any conventional means such as by spot welding 66. Once the extractor 44' is attached to the nut 46, a hole is drilled into the nut. A roll pin 68 is inserted into the hole to permanently affix the nut to the threaded rod 16.

Yet another embodiment of the bearing puller 10 is shown in FIG. 8*c*. In this figure, the top end portion 18 is identical in structure as the top end portion illustrated in FIG. 1–3, 8*a* and 8*b*, however, the bottom end portion 20 is altered. Located on the bottom of the threaded rod 16 is a thick extractor 44'. This extractor 44' is at least twice the thickness of the extractor illustrated in FIGS. 1–3. Additionally the bottom area of the extractor 44' is tapered to form a bevel. Further, the extractor can have the same shapes as the extractors 44 illustrated in FIG. 5*a*–5*c*. Atop of the extractor 44' is a nut 46.

The extractor 44' is illustrated in more detail in FIG. 8*e*. In this figure, the extractor is shown to be threaded 64. Since the extractor 44' and the nut 46 are threaded, they are held in place by torque, braising, or spot welding.

The bearing puller 10, illustrated in FIGS. 8*a*–8*c* operates in the same manner as in FIGS. 1–3.

The purpose of nut 46 is to maintain the extractors 44 or 44' in place. The size of the nut is not relevant.

All of the components of the bearing puller 10, except the washers, are provided with an anti-rust finish. These components can be finished by any conventional means such as a chemical process, hot dipping, or heat finishing.

Figure 9A:
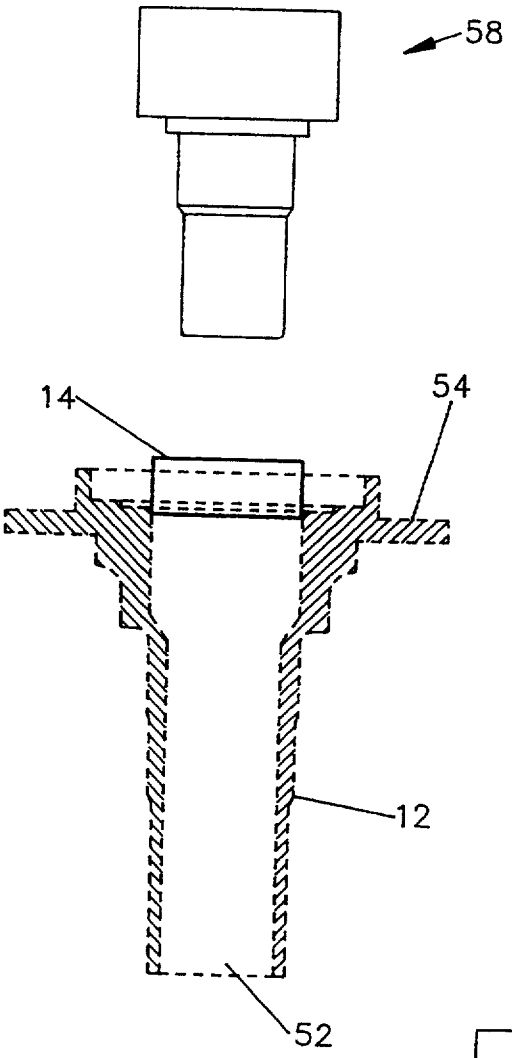
FIGS. 9*a* and 9*b* are side views of a bearing installer placing a bearing into a spindle.
Figure 9B:
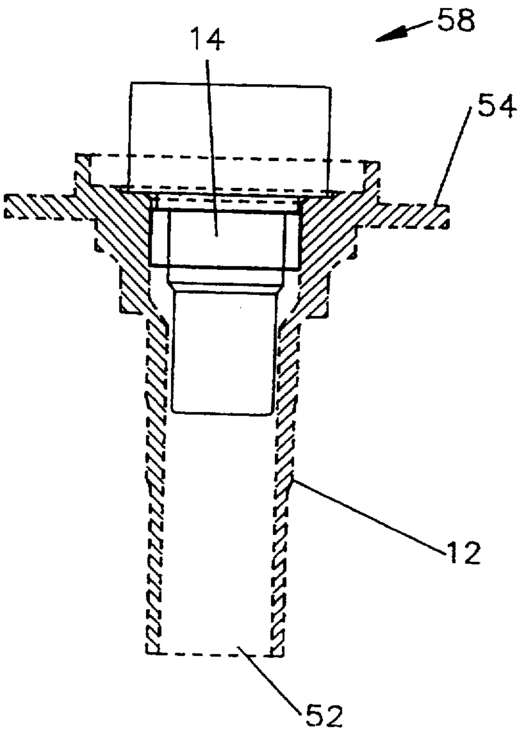

FIGS. 9*a* and 9*b* illustrates a side view of a bearing installer used to insert a bearing into the spindle. As seen in this figure, the bearing installer 58 has a step-like shape, wherein the two thinnest portions fit through the bearing 14. To insert a bearing 14 in the spindle 12, the spindle 12 is placed on a flat surface. The bearing 14 is centered in the bore 52 of the spindle 12. The bearing installer 58 is then placed through the bearing (see FIG. 9*a*).

In order not to damage the bearing 14, the bearing installer 58 is rotated when driving the bearing 14 into the spindle 12. The bearing installer 58 is driven into the spindle 12 until it communicates with the spindle flange 54, causing the bearing to be driven to the proper depth within the spindle. Thus installation of the bearing is completed (see FIG. 9*b*).

While the invention has seen particularly shown and described with reference to an embodiment thereof, it will be understood by those skilled in the art, that various changes in form and detail may be made without departing from the spirit and scope of the invention.

I claim:

1. A tool for removing a bearing from a spindle comprising:
an elongated threaded rod;
said elongated threaded rod having a first diameter, a top end portion, and a bottom end portion;
said top end portion having a first threaded nut, a first washer, a puller body member, and a second washer;
said first threaded nut being threadably attached to said top end portion of said elongated threaded rod;
said first washer is located beneath said threaded nut;
said first washer includes a first hole having a second diameter and said first hole being located in the center of said first washer;
said second diameter being slightly larger than said first diameter;
said elongated threaded rod is received in said first hole;
said puller body member is located beneath said first washer and includes a circular top wall, an encompassing cylindrical side wall, and an open bottom;
said circular top wall affixed to said encompassing cylindrical side wall;
said circular top wall includes a second hole having a third diameter and said second hole being located in the center of said circular top wall;
said third diameter being slightly larger than said first diameter;
said elongated threaded rod is received in said second hole;
said second washer is located beneath said puller body member;
said second washer includes a third hole having a fourth diameter and said third hole is being located in the center of said second washer;
said fourth diameter being slightly larger than said first diameter;
said elongated threaded rod is received in said third hole;
said bottom end portion including a second threaded nut, a third washer, an extractor and a fourth threaded nut;
said second threaded nut being permanently attached to said bottom end portion of said elongated threaded rod by a securing means;
said second threaded nut having a top surface and a bottom surface;
said top surface faces said top end portion;
said third washer being in direct contact with said top surface of said second threaded nut;
said third washer includes a fourth hole and said fourth hole being located in the center of said third washer;
said fourth hole having a fifth diameter;
said fifth diameter being slightly larger than said first diameter;
said elongated threaded rod is received in said fourth hole;
said extractor being located atop of said third washer and being in direct contact with said third washer;

said extractor having a fifth hole and said fifth hole being located in the center of said extractor;

said fifth hole having a sixth diameter;

said sixth diameter being larger than said first diameter;

said elongated threaded rod is received in said fifth hole;

said extractor having extends outwardly beyond said third washer;

said third nut being located atop of said extractor and being in direct contact with said extractor;

said third nut being threadably attached to said elongated threaded rod; and said third nut constrains said extractor and said third washer to a fixed position.

2. The tool for removing a bearing from a spindle as in claim 1 further comprising a viewing hole in said encompassing cylindrical side wall of said puller body member for viewing said bearing being removed from said spindle.

3. The tool for removing a bearing from a spindle as in claim 1, wherein said securing means is welding.

4. The tool for removing a bearing from a spindle as in claim 1, wherein said securing means is a roll pin.

5. The tool for removing a bearing from a spindle as in claim 1, wherein said third washer is concave with respect to said top surface of said second threaded nut.

6. The tool for removing a bearing from a spindle as in claim 5, wherein said extractor is concave with respect to said top surface of said second threaded nut.

7. The tool for removing a bearing from a spindle as in claim 1, wherein said extractor has three flanges.

8. The tool for removing a bearing from a spindle as in claim 7 wherein said extractor forms a triangular shape.

9. The tool for removing a bearing from a spindle as in claim 7, wherein said triangular shape includes three sides which are concaved.

10. The tool for removing a bearing from a spindle as in claim 1, wherein said extractor has four flanges.

11. The tool for removing a bearing from a spindle as in claim 1, wherein said second hole of said puller body member has a top area, a middle area and a bottom area, said top area and said bottom area are countersunk.

12. A tool for removing a bearing from a spindle comprising:

an elongated threaded rod;

said elongated threaded rod having a first diameter, a top end portion and a bottom end portion;

said first threaded nut being threadably attached to said top end portion of said elongated threaded rod;

said first washer is located beneath said threaded nut;

said first washer includes a first hole having a second diameter and said first hole is located in the center of said first washer;

said second diameter being slightly larger than said first diameter;

said elongated threaded rod is received in said first hole;

said puller body member is located beneath said first washer and includes a circular top wall, an encompassing cylindrical side wall, and an open bottom;

said encompassing cylindrical side wall is attached to said circular top wall;

said circular top wall includes a hole having a third diameter and said hole being located in the center of said circular top wall;

said third diameter being slightly larger than said first diameter;

said elongated threaded rod is received in said second hole;

said second washer is located beneath said puller body member;

said second washer includes a third hole having a fourth diameter and said third hole is located in the center of said second washer;

said fourth diameter being slightly larger than said first diameter;

said elongated threaded rod is received in said third hole;

said bottom end portion including a second threaded nut and an extractor;

said extractor being attached to said bottom end portion of said elongated threaded rod;

said extractor having a top surface and a bottom surface;

said top surface faces said top end portion;

said second threaded nut being in direct contact with said top surface of said extractor;

said second threaded nut being threadably attached to said elongated threaded rod; and said extractor extends outwardly and beyond said second threaded nut;

13. A tool for removing a bearing from a spindle as in claim 12 further comprising a viewing hole in said encompassing cylindrical side wall of said puller body member for viewing said bearing being removed from said spindle.

14. The tool for removing a bearing from a spindle as in claim 12 wherein said extractor has a fourth hole located in the middle of said extractor, said fourth hole is threaded, and is threadably attached to said elongated threaded rod.

15. The tool for removing a bearing from a spindle as in claim 12 wherein said extractor is permanently secured to said second threaded nut by an attachment means, and said second nut is permanently attached to said elongated threaded rod by a roll pin.

16. The tool for removing a bearing from a spindle as in claim 12 wherein a third nut is in contact to said bottom surface of said extractor, and said third nut is permanently attached to said elongated threaded rod.

17. The tool for removing a bearing from a spindle as in claim 12 wherein said extractor has a bottom portion and a top portion, said top portion faces said top end portion, and said bottom portion of said extractor is tapered.

18. The tool for removing a bearing from a spindle as in claim 12 wherein said extractor has a triangular shape.

19. The tool for removing a bearing from a spindle as in claim 12 wherein said second hole of said puller body member has a top area, a middle area and a bottom area, said top area and said bottom area are countersunk.

* * * * *